United States Patent Office 2,696,463
Patented Dec. 7, 1954

2,696,463

PURIFICATION OF ALCOHOL

Melvin M. Baevsky, Penns Grove, N. J., assignor to E. I. du Pont de Nemours and Company, Wilmington, Del., a corporation of Delaware No Drawing. Application June 26, 1952,
Serial No. 295,809

6 Claims. (Cl. 202—57)

This invention relates to a process for the purification of ethyl alcohol and particularly to a method for providing ethyl alcohol which has a high degree of purity so that it is suitable for use in perfumes and pharmaceuticals.

Varying amounts of aldehydes, ketones, esters and acids are formed in the fermentation process for making ethyl alcohol. The synthesis of ethyl alcohol also produces aldehydes, including some unsaturated aldehydes, and frequently produces some ketones. Also, crude synthetic alcohol frequently contains some mineral acid from the substances employed in the synthesis. The bulk of such impurities can be removed by the usual distillation procedures, but small amounts thereof resist separation by distillation and remain in the alcohol. Such impurities, even when present in very small amounts, render the alcohol unsuitable for many purposes. The aldehydes and ketones are particularly objectionable because of their odor. Where the alcohol is to be used in perfumes and pharmaceuticals, the highest degree of purity and freedom from foreign odor is absolutely essential.

The purity of ethyl alcohol is generally gauged by the Allen minute test (see Allen's Commercial Organic Analysis, 5th edition, volume 1, pages 135–136). This test involves the addition of 2 cc. of a 0.02% solution of potassium permanganate to 50 cc. of the alcohol at 15–16° C. The time in minutes, required for the disappearance of the pink color produced by the permanganate, is commonly known as the permanganate time and is an indication of the purity of the alcohol; the longer the permanganate time, the higher the purity of the alcohol. A permanganate time of 30 minutes is usually regarded as a minimum acceptable purity in most cases where a substantially pure alcohol is required.

It has long been a serious problem to find a simple and economical method for removing the aldehydes and ketones from ethyl alcohol to the extent desired. Ballard and Geyer, in Patent No. 2,533,754, disclose that synthetic ethyl alcohol can be purified by refluxing it for from one-half to 5 hours in the presence of an alkali metal hydroxide and then distilling, whereby aldehydes are removed from the alcohol and the alcohol has a permanganate time of from 15 to 46 minutes. The refluxing required is time consuming and expensive and must be carried out in batches. Maycock and Dunn, in Patent No. 2,575,556, disclose that the treatment of alcohol with an alkali metal hydroxide, but without refluxing for extended periods of time, will neutralize the acidic impurities, but will not effectively remove the aldehydes from the alcohol and hence they employ hydrogenation procedures to reduce the aldehydes. Such hydrogenation procedures are also time consuming and expensive.

It is an object of my invention to provide a new and improved process for purifying ethyl alcohol. Another object is to provide such a process which is particularly effective for removing aldehydes and ketones from the alcohol and which is simple, economical and easy to operate and control. A particular object is to provide such a process which will purify the ethyl alcohol to such an extent that it is especially suitable for use in perfumes and pharmaceuticals. A further object is to advance the art. Still other objects will appear hereinafter.

The above and other objects may be accomplished in accordance with my invention which comprises purifying aqueous ethyl alcohol, containing a small proportion of at least one member of the group consisting of aldehydes and ketones, by a process which consists essentially of continuously passing a stream of such aqueous alcohol to a rectifying column; continuously injecting into the stream of aqueous alcohol, before it enters the rectifying column, an aqueous solution of sodium hydroxide; simultaneously continuously injecting into the stream of aqueous alcohol and sodium hydroxide, immediately prior to the introduction of said stream into the rectifying column, an aqueous solution of at least one member of the group consisting of sodium bisulfite and sodium sulfite in an amount sufficient to provide at least 1 mol of sodium sulfite for each mol of the aldehydes and ketones present in the alcohol; the rate of injection of the sodium hydroxide into the stream being regulated so that the stream entering the rectifying column, has a pH from 9 to about 13.5; and immediately distilling purified ethyl alcohol continuously from the stream in the rectifying column.

By such process, the aldehydes, ketones and acidic impurities are efficiently and effectively removed from the alcohol and the alcohol obtained has a high degree of purity, having permanganate times of at least 35 minutes and usually above 45 minutes even when the alcohol had a permanganate time of 0 minute prior to such treatment. The ethyl alcohol, so obtained, has a grade 1 odor and thus is free of aldehyde, ketone and other foreign odors.

It is well known that alkali metal bisulfites and neutral alkali metal sulfites form compounds with aldehydes and ketones which usually crystallize well and which are known as aldehyde bisulfites and ketone bisulfites, respectively. The reactions of sodium bisulfite and sodium sulfite with aldehydes are shown in the following equations:

1.  $R\text{---}CHO + NaHSO_3 \rightarrow R\text{---}CH(OH)SO_3Na$
2.  $R\text{---}CHO + Na_2SO_3 + H_2O \rightarrow$ 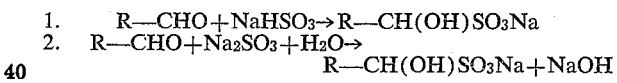
    $R\text{---}CH(OH)SO_3Na + NaOH$ It is also well known that such compounds are easily decomposed by acids and alkalis to regenerate the aldehydes. Therefore, it was not obvious and could not be predicted that the sodium bisulfite and the sodium sulfite would effectively remove the aldehydes and ketones from the ethyl alcohol under the strongly alkaline conditions of the present process.

The aqueous ethyl alcohol, which is to be treated in accordance with my invention, may be of any strength which is suitable for rectification and has an inferior odor, but usually will be from about 20 proof to about 190 proof. My process is particularly applicable for the purifying of crude 20 to 100 proof ethyl alcohol, whereby such alcohol can be converted into 190 proof alcohol of a high degree of purity in a single rectification. Also, the alcohol preferably will have been subjected to the usual preliminary stripping or distillation to remove the bulk of the impurities so that the alcohol contains only a small proportion of the aldehydes and ketones, resulting in a saving of the sodium bisulfite and sodium sulfite required in the process of my invention.

Ordinarily, the crude ethyl alcohol, which is to be treated, will have a permanganate time of zero minute. However, it will be apparent that my process is also useful to improve the purity of aqueous ethyl alcohol which has a permanganate time above zero minute but below that obtainable by my process.

The crude aqueous ethyl alcohol will be continuously passed to the usual conventional rectifying column and the aqueous sodium hydroxide and the aqueous solution of the sodium bisulfite or sodium sulfite will be injected into the stream of the aqueous ethyl alcohol immediately prior to the introduction of such stream into the rectifying column. The sodium sulfite or sodium bisulfite may be dissolved in the sodium hydroxide solution, or an aqueous solution of the sodium sulfite or sodium bisulfite may be injected into the aqueous alcohol at the point of injection of the aqueous sodium hydroxide. Neither the sodium bisulfite nor the sodium sulfite should be injected into the stream of aqueous alcohol in advance of the point of injection of the aqueous sodium hydroxide because the acids in the alcohol tend to break-down the sodium bisulfite and the sodium sulfite. Preferably and most conveniently, the aqueous solution of sodium sulfite or sodium bisulfite is injected downstream from the point of injection of the aqueous sodium hydroxide, so that the sodium hydroxide will have an opportunity to mix thoroughly with the aqueous alcohol and neutralize any acids therein prior to the injection of the solution of sodium bisulfite or sodium sulfite.

It will generally be preferred to employ aqueous solutions of sodium bisulfite because it is more readily available than the sodium sulfite. Such sodium bisulfite is immediately converted to sodium sulfite upon mixing with the sodium hydroxide.

The sodium bisulfite and sodium sulfite must be injected into the alcohol in an amount sufficient to provide at least one mol of sodium sulfite for each mol of the aldehydes and ketones present in the alcohol and, preferably, somewhat in excess. Usually, the alcohol will contain from about 0.01% to about 0.1% of aldehydes by weight and smaller amounts of ketones. In such case, the solution of sodium sulfite or sodium bisulfite should be such as to provide from 0.01% to about 0.5% by weight of sodium sulfite based on the alcohol.

The amount of sodium hydroxide, injected into the stream of aqueous alcohol, must be regulated so that the stream entering the rectifying column has a pH of from 9 to about 13.5. Such amount will be dependent upon the amount of acid or acidic materials present in the alcohol. Also, when sodium sulfite is employed, a smaller amount of sodium hydroxide will be required because the reaction of sodium sulfite with the aldehydes and ketones liberates an equivalent amount of alkali. Usually, the injection of the aqueous sodium hydroxide will be made through valves automatically controlled by a pH controller in conventional manner. The injection of the solutions of sodium bisulfite and sodium sulfite may also be made by automatic control.

The concentrations of the aqueous solutions of sodium hydroxide and of sodium sulfite or sodium bisulfite may be varied as desired. For practical purposes, the aqueous sodium hydroxide solutions will contain the sodium hydroxide in a concentration of from about 10% to about 40% by weight and, preferably, in a concentration of about 30%. Also, for practical purposes, the aqueous solutions of the sodium bisulfite and the sodium sulfite will contain such compounds in a concentration of from about 10% up to a saturated solution and, preferably, of about 30% by weight.

The residue or bottoms from the rectifying column may also be recycled and injected into the stream of aqueous alcohol to utilize the excess sodium hydroxide and sodium sulfite therein, together with any additional sodium hydroxide and bisulfite required to produce the desired pH and the desired amount of sodium sulfite in the alcohol. In this latter case, a small percentage of the bottoms will be constantly purged from the rectifying column.

In order to more clearly illustrate my invention and the advantageous results to be obtained thereby, examples are given hereinafter in which the crude aqueous alcohol was obtained by fermentation and had been subjected to a preliminary distillation to remove the bulk of the impurities, whereby the crude aqueous alcohol contained from about 0.01 to about 0.1% by weight of aldehydes, an average of about 0.05% by weight, and usually smaller amounts of ketones.

*Example 1*

A crude aqueous ethyl alcohol effluent from a stripping column, containing 15% ethyl alcohol and having a zero permanganate time, was fed to a conventional bubble cap rectifier at a rate of 3000 gals. per hour. Aqueous 30% sodium hydroxide was fed into the pipe carrying the feed. A few feet further along the pipe toward the rectifier an aqueous solution of 30% sodium bisulfite was fed in at a rate of 2.3 gals. per hour, which is equivalent to 7.45 lbs. of sodium bisulfite per hour. The rate of feed of the sodium hydroxide was adjusted so that the pH of the solution, immediately before the rectifier, was held at 12.8±0.5. The overhead effluent from the rectifier was 96.8% ethyl alcohol and had a permanganate time of 50 minutes. The aqueous effluent from the bottom of the rectifier had a pH of 11.6±0.5.

*Example 2*

To a crude aqueous ethyl alcohol, containing 15% ethyl alcohol and having a zero permanganate time, were added sodium hydroxide and sodium bisulfite solutions in the manner of Example 1. The feed to the rectifier, was at a rate of 3000 gals. per hour, the sodium bisulfite feed was at a rate of 8.75 lbs. per hour and the rate of feed of 30% sodium hydroxide was sufficient to maintain the feed stream just before the rectifier at a pH of 12.4±0.5. The overhead product from the rectifier was 95.4% ethyl alcohol which had a permanganate time of 50 minutes. The bottom effluent from the rectifier had a pH of 10.1–10.7.

*Example 3*

To a crude aqueous ethyl alcohol, containing 15% ethyl alcohol and having a zero permanganate time, fed at a rate of 3000 gals. per hour to the rectifier, was added, in the manner of Example 1, 3.12 lbs. of sodium bisulfite per hour and sufficient sodium hydroxide to keep the pH at the entrance to the rectifier at 9.7±0.5. The rectified alcohol was 96.6% strength and had a permanganate time of 48 minutes. The aqueous effluent from the bottom of the still had a pH of 8.5–9.3.

*Example 4*

A crude aqueous ethyl alcohol, containing 50% ethyl alcohol and having a zero permanganate time, was fed to the rectifier at a rate of 1200 gals. per hour. In the same manner as in Example 1, 5.44 lbs. per hour of sodium bisulfite, which is 1.68 gals. of 30% solution, was fed to the stream. Aqueous 30% sodium hydroxide was added before the bisulfite feed at a rate sufficient to keep the pH of the feed at the rectifier intake at 9.0 to 9.8. The overhead stream from the rectifier was 96.0% ethyl alcohol with a permanganate time of 35 minutes. The aqueous effluent from the bottom of the still had a pH of 8.5–9.3.

As a control, a similar 50% crude aqueous ethyl alcohol feed stock was fed to the rectifier at a rate of 1200 gals. per hour, without the addition of sodium hydroxide and sodium bisulfite. The pH was 3.8±0.5 as the feed entered the rectifier and the pH of the aqueous effluent at the bottom of the still was 3.7±0.5. The overhead stream contained 95.3% ethyl alcohol and had a permanganate time of 1 minute.

It will be understood that the preceding examples have been given for illustrative purposes solely and that my invention is not limited to the specific embodiments exemplified therein. It will be apparent that such process can be employed similarly with crude synthetic alcohol, with aqueous alcohol of higher or lower proof, and with alcohol having permanganate times between zero and those obtainable by my process. Also, sodium sulfite can be used in place of the sodium bisulfite, and the amounts of sodium bisulfite or sodium sulfite employed may be somewhat widely varied within the limits hereinbefore disclosed and in accord with the principles of my invention.

My process may be adapted to the usual purification processes without extensive alteration thereof or of the equipment employed therein. It eliminates expensive and time consuming procedures previously employed, such as refluxing or holding in vessels for substantial reaction periods, and the equipment required therefor. The purification is carried out in a continuous manner instead of in batches. Thus, my process permits the production of purified alcohol with a lower investment in plant equipment, with a smaller inventory of alcohol in the process, and at a faster production rate. It is simple and economical to operate. Also, because of the high alkalinity which can be tolerated and the wide range of permissible variations thereof, the process is easy to control. At the same time, the impurities are more effectively removed from the alcohol so that alcohol of higher desired purity is consistently obtained. Accordingly, it is apparent that my invention constitutes a valuable contribution to and advance in the art.

I claim:

1. The process for purifying aqueous ethyl alcohol containing a small proportion of at least one member of the group consisting of aldehydes and ketones, which process consists essentially of continuously passing a stream of such aqueous alcohol to a rectifying column, continuously injecting into the stream of aqueous alcohol before it enters the rectifying column an aqueous solution of sodium hydroxide, simultaneously continuously injecting into the stream of aqueous alcohol and sodium hydroxide immediately prior to the introduction of said stream into the rectifying column an aqueous solution of at least one member of the group consisting of sodium bisulfite and sodium sulfite in an amount sufficient to provide at least 1 mol of sodium sulfite for each mol of the aldehydes and ketones present in the alcohol, the rate of injection of the sodium hydroxide being regulated so that the stream entering the rectifying column has a pH of from 9 to about 13.5, and immediately distilling purified ethyl alcohol continuously from the stream in the rectifying column.

2. The process for purifying aqueous ethyl alcohol of from about 20 to about 190 proof containing a small proportion of at least one member of the group consisting of aldehydes and ketones, which process consists essentially of continuously passing a stream of such aqueous alcohol to a rectifying column, continuously injecting into the stream of aqueous alcohol before it enters the rectifying column an aqueous solution of sodium hydroxide, simultaneously continuously injecting into the stream of aqueous alcohol and sodium hydroxide immediately prior to the introduction of said stream into the rectifying column an aqueous solution of at least one member of the group consisting of sodium bisulfite and sodium sulfite in an amount sufficient to provide at least 1 mol of sodium sulfite for each mol of the aldehydes and ketones present in the alcohol, the rate of injection of the sodium hydroxide being regulated so that the stream entering the rectifying column has a pH of from 9 to about 13.5, and immediately distilling purified ethyl alcohol continuously from the stream in the rectifying column.

3. The process for purifying crude aqueous ethyl alcohol of from about 20 to about 100 proof containing a small proportion of at least one member of the group consisting of aldehydes and ketones, which process consists essentially of continuously passing a stream of such aqueous alcohol to a rectifying column, continuously injecting into the stream of aqueous alcohol before it enters the rectifying column an aqueous solution of sodium hydroxide, simultaneously continuously injecting into the stream of aqueous alcohol and sodium hydroxide immediately prior to the introduction of said stream into the rectifying column an aqueous solution of at least one member of the group consisting of sodium bisulfite and sodium sulfite in an amount sufficient to provide at least 1 mol of sodium sulfite for each mol of the aldehydes and ketones present in the alcohol, the rate of injection of the sodium hydroxide being regulated so that the stream entering the rectifying column has a pH of from 9 to about 13,5, and immediately distilling purified ethyl alcohol continuously from the stream in the rectifying column.

4. The process for purifying aqueous ethyl alcohol containing a small proportion of at least one member of the group consisting of aldehydes and ketones, which process consists essentially of continuously passing a stream of such aqueous alcohol to a rectifying column, continuously injecting into the stream of aqueous alcohol before it enters the rectifying column an aqueous solution of sodium hydroxide in which the sodium hydroxide is in a concentration of from about 10% to about 40% by weight, simultaneously continuously injecting into the stream of aqueous alcohol and sodium hydroxide immediately prior to the introduction of said stream into the rectifying column an aqueous solution of at least one member of the group consisting of sodium bisulfite and sodium sulfite in which such member is in a concentration of at least about 10% by weight in an amount sufficient to provide at least 1 mol of sodium sulfite for each mol of the aldehydes and ketones present in the alcohol, the rate of injection of the sodium hydroxide being regulated so that the stream entering the rectifying column has a pH of from 9 to about 13.5, and immediately distilling purified ethyl alcohol continuously from the stream in the rectifying column.

5. The process for purifying crude aqueous ethyl alcohol of from about 20 to about 100 proof containing a small proportion of at least one member of the group consisting of aldehydes and ketones, which process consists essentially of continuously passing a stream of such aqueous alcohol to a rectifying column, continuously injecting into the stream of aqueous alcohol before it enters the rectifying column an aqueous solution of sodium hydroxide in which the sodium hydroxide is in a concentration of from about 10% to about 40% by weight, and simultaneously continuously injecting into the stream of aqueous alcohol and sodium hydroxide immediately prior to the introduction of said stream into the rectifying column an aqueous solution of at least one member of the group consisting of sodium bisulfite and sodium sulfite in which such member is in a concentration of at least about 10% by weight in an amount sufficient to provide from 0.01% to about 0.5% by weight based on the alcohol of sodium sulfite and at least 1 mol of sodium sulfite for each mol of the aldehydes and ketones present in the alcohol, the rate of injection of the sodium hydroxide being regulated so that the stream entering the rectifying column has a pH of from 9 to about 13.5, and immediately distilling purified ethyl alcohol continuously from the stream in the rectifying column.

6. The process for purifying crude aqueous ethyl alcohol containing a small proportion of at least one member of the group consisting of aldehydes and ketones, which process consists essentially of continuously passing a stream of such aqueous alcohol to a rectifying column, continuously injecting into the stream of aqueous alcohol before it enters the rectifying column an aqueous solution of sodium hydroxide in which the sodium hydroxide is in a concentration of about 30% by weight, and simultaneously continuously injecting into the stream of aqueous alcohol and sodium hydroxide immediately prior to the introduction of said stream into the rectifying column an aqueous solution of at least one member of the group consisting of sodium bisulfite and sodium sulfite in which such member is in a concentration of about 30% in an amount sufficient to provide from 0.01% to about 0.5% by weight based on the alcohol of sodium sulfite and at least 1 mol of sodium sulfite for each mol of the aldehydes and ketones present in the alcohol, the rate of injection of the sodium hydroxide being regulated so that the stream entering the rectifying column has a pH of from 9 to about 13.5, and immediately distilling purified ethyl alcohol continuously from the stream in the rectifying column.

References Cited in the file of this patent

UNITED STATES PATENTS

| Number | Name | Date |
|---|---|---|
| 432,198 | Guignard | July 15, 1890 |
| 1,095,830 | Exstrom | May 5, 1914 |